US011359985B2

(12) United States Patent
Ned et al.

(10) Patent No.: US 11,359,985 B2
(45) Date of Patent: Jun. 14, 2022

(54) OIL FILLED TRANSDUCERS WITH ISOLATED COMPENSATING CAPSULE

(71) Applicant: KULITE SEMICONDUCTOR PRODUCTS, INC., Leonia, NJ (US)

(72) Inventors: Alexander A. Ned, Kinnelon, NJ (US); Sorin Stefanescu, New Milford, NJ (US); Andrew Bemis, Upper Saddle River, NJ (US); Scott Goodman, Wayne, NJ (US)

(73) Assignee: KULITE SEMICONDUCTOR PRODUCTS, INC., Leonia, NJ (US)

( * ) Notice: Subject to any disclaimer, the term of this patent is extended or adjusted under 35 U.S.C. 154(b) by 466 days.

(21) Appl. No.: 16/538,123

(22) Filed: Aug. 12, 2019

(65) Prior Publication Data

US 2021/0048363 A1    Feb. 18, 2021

(51) Int. Cl.
| *G01L 19/06* | (2006.01) |
| *G01L 9/00* | (2006.01) |
| *G01L 19/02* | (2006.01) |
| *G01L 19/04* | (2006.01) |
| *G01L 19/00* | (2006.01) |

(52) U.S. Cl.
CPC ...... *G01L 19/0645* (2013.01); *G01L 19/0038* (2013.01)

(58) Field of Classification Search
CPC ... G01L 9/12; G01L 9/00; G01L 19/14; G01L 1/22; G01L 9/04; G01L 13/02; G01L 19/06; G01L 19/0038; G01L 19/0645
See application file for complete search history.

(56) References Cited

U.S. PATENT DOCUMENTS 6,255,728 B1 *   7/2001   Nasiri ................. G01L 19/0038
                                                 257/666
6,591,686 B1 *   7/2003   Kurtz ..................... G01L 9/0054
                                                 73/721

* cited by examiner

*Primary Examiner* — Brandi N Hopkins
(74) *Attorney, Agent, or Firm* — Troutman Pepper Hamilton Sanders LLP; James E. Schutz; Mark Lehi Jones (57) ABSTRACT

The disclosed technology includes an oil-filled pressure transducer assembly and an oil-filled compensating sensing element disposed near one another and attached to a common housing. The oil-filled pressure transducer assembly may receive and measure pressure media via a first oil-filled cavity and a protective diagram in communication with the pressure media. The compensating sensing element may be isolated from the pressure media. In certain example implementations, the compensating sensing element is configured to measure certain common error phenomena that are also measured by the oil-filled pressure transducer assembly, for example, due to acceleration, temperature, and/or vibration. In certain implementations, the signal measured by the compensating sensing element may be subtracted from the signal measured by the oil-filled pressure transducer assembly to provide a compensated output signal.

20 Claims, 7 Drawing Sheets

OIL FILLED TRANSDUCERS WITH ISOLATED COMPENSATING CAPSULE

FIELD

The disclosed technology relates to pressure transducers, and more particularly to oil-filled transducers having a main transducer and an isolated transducer capsule configured to compensate for measurement errors in the main transducer.

BACKGROUND

Oil filled transducers can be particularly well-suited for use in harsh, conductive, and/or corrosive environments for pressure sensing applications. In such transducers, pressure from the harsh environment is received by a (typically metal) diaphragm and transferred to an oil-filled chamber, which transfers the pressure to an internal sensing element within the oil-filled chamber. Thus, the sensing element can be completely isolated from the pressure media and protected by the oil. However, the performance of such a transducer is susceptible to measurement error due to factors such as acceleration, vibration, etc.

A need still exists for robust transducers that in which measurement errors can be reduced or eliminated.

BRIEF SUMMARY

Some or all of the above needs may be addressed by certain implementations of the disclosed technology. Certain implementations of the disclosed technology may include systems and methods for a pressure sensor device.

In one example implementation of the disclosed technology, an oil-filled pressure transducer assembly is provided. The assembly includes: a housing having an input port configured to receive pressure; an oil-filled pressure sensing capsule attached to the housing and in communication with the input port, wherein the oil-filled pressure sensing capsule is configured to output a pressure and common error signal responsive to pressure received at the input port and common error stimulus acting on the transducer assembly, the common error stimulus comprising one or more of vibration, acceleration, and temperature; an oil-filled compensating capsule attached to the housing adjacent to the oil-filled pressure sensing capsule and isolated from the input port, wherein the oil-filled compensating capsule is configured to output a compensation signal responsive to the common error stimulus; and a compensation circuit in communication with the oil-filled pressure sensing capsule and the oil-filled compensating capsule, the compensation circuit configured to output a compensated pressure output signal based on a difference between the pressure and common error signal of the oil-filled pressure sensing capsule and the compensation signal of the oil-filled compensating capsule.

In another example implementation, a method of assembling a pressure transducer assembly is provided. The method includes: providing a first sensing element and a second sensing element, each sensing element comprising: a membrane diaphragm; a protective diaphragm; one or more piezoresistive elements in communication with the membrane diaphragm; and an oil cavity in communication with the membrane diaphragm and the protective diaphragm. The method includes filling the oil cavity of the first sensing element with oil; evacuating air from the oil of the oil cavity of the first sensing element and sealing the oil cavity of the first sensing element; populating a first header with the oil-filled, evacuated, and sealed first sensing element; providing a housing having an input port configured to receive pressure; installing the populated first header in a housing, wherein the protective diaphragm is in communication with the input port. The method includes: filling the oil cavity of the second sensing element with oil; evacuating air from the oil of the oil cavity of the second sensing element and sealing the oil cavity of the second sensing element; populating a second header with the oil-filled, evacuated, and sealed second sensing element; and installing the populated second header in the housing adjacent to the first header, wherein the protective diaphragm of the second sensing element is isolated from the input port.

Other implementations, features, and aspects of the disclosed technology are described in detail herein and are considered a part of the claimed disclosed technology. Other implementations, features, and aspects can be understood with reference to the following detailed description, accompanying drawings, and claims.

DETAILED DESCRIPTION

The disclosed technology includes an oil-filled pressure transducer assembly having a pressure sensing capsule and a compensating sensing capsule mounted near one another in the assembly. The pressure sensing capsule may receive pressure via a protective diagram that is in communication with the pressure media. The received pressure may be transferred to a pressure sensing element of the pressure sensing capsule via a first oil-filled cavity in communication with the protective diaphragm. The compensating sensing capsule may be communication with a second-oil filled cavity that is isolated from the pressure media. In certain example implementations, the compensating sensing capsule is configured to measure certain common error phenomena that act on both the pressure sensing and compensating sensing capsules while being insensitive to pressure fluxuations in the pressure media. In certain example implementations, the signal measured by a compensating sensing element of the compensating sensing capsule may be subtracted from the signal measured by the pressure sensing element of the pressure sensing capsule to provide an output signal that is compensated for common error errors, for example, due to acceleration and/or vibration.

Some implementations of the disclosed technology will be described more fully hereinafter with reference to the accompanying drawings. This disclosed technology may be embodied in many different forms and should not be construed as limited to the implementations set forth herein.

Figure 1:
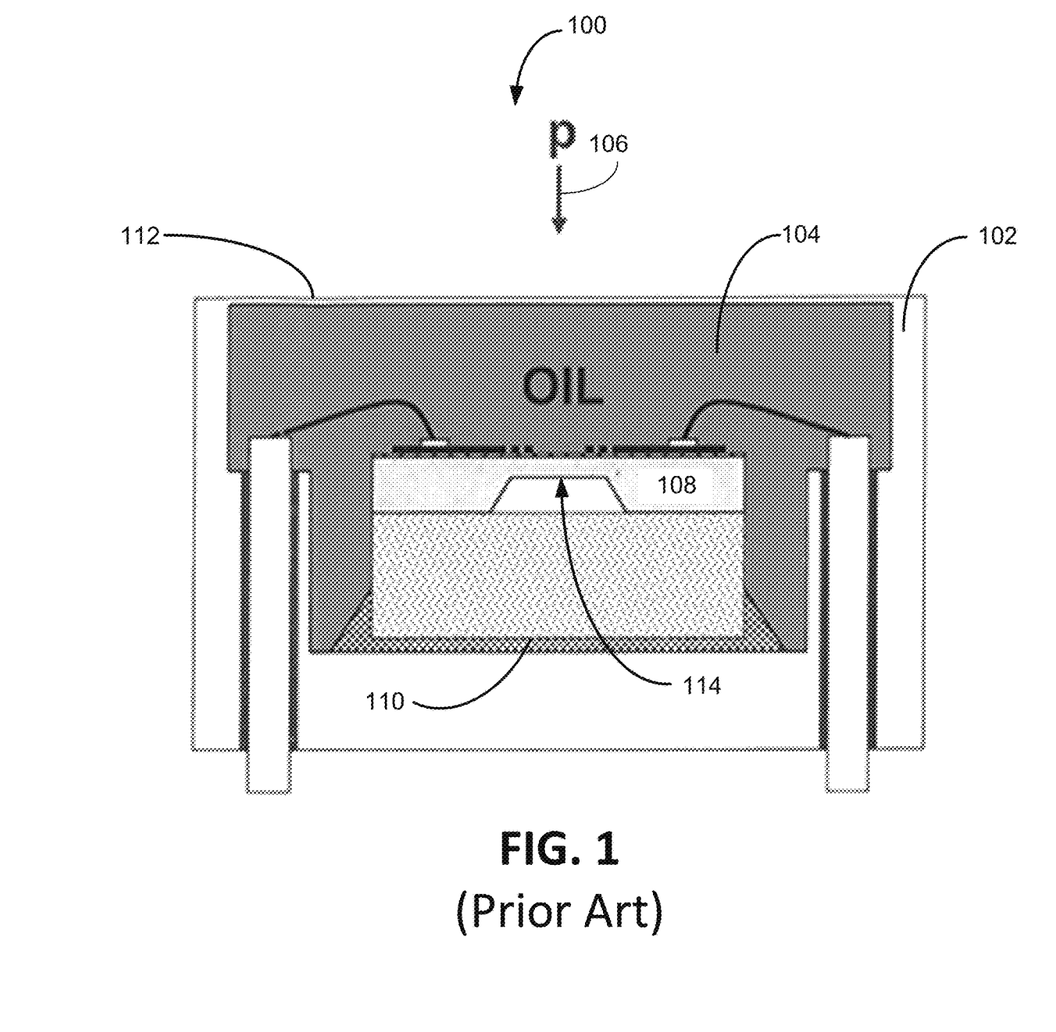
FIG. 1 depicts a cross-sectional side-view of a conventional enclosed and oil-filled sensor assembly.

FIG. 1 depicts a conventional oil-filled transducer assembly 100 having a single sensing element 108 placed inside a housing 102 that is filled with oil 104. The sensing element 108 typically includes piezoelectric elements arranged in Wheatstone bridge configuration and in communication with a small deflecting membrane 114 of the sensing element 108. External pressure 106 is transferred from the (typically metal) isolation diaphragm 112, through the oil 104 (acting as an incompressible fluid), and to the small deflecting membrane diaphragm 114. Thus, the isolation diaphragm 112 and oil 104 act to isolate the sensing element 108 from harsh or corrosive pressure media. The small membrane diaphragm 114 on the sensing element 108 has a small mass that, together with the mass of the oil 104 and/or the isolation diaphragm 112, can introduce measurement errors dependent on the magnitude and orientation of the acceleration and vibration acting on the assembly 100.

U.S. Pat. No. 6,293,154, entitled "Vibration Compensated Pressure Sensing Assembly," assigned to Kulite Semiconductor Products, Inc., and incorporated herein by reference as if presented in full, describes a technology for performing acceleration/vibration compensation on a sensing element that does not utilize the protective oil filling or isolation diaphragm. However, as discussed above, certain harsh environment applications may require the use of an oil-filled transducer, such as depicted in FIG. 1. Compensating for acceleration/vibration in an oil-filled transducer has its own unique set of challenges, due at least in part to the mass of the oil that can be significantly larger than the mass of a typical membrane diaphragm. Thus, in certain applications, the oil in an oil-filled transducer may be a dominant factor in the acceleration- and vibration-related errors.

In accordance with certain example implementations of the disclosed technology, acceleration/vibration errors may be reduced or eliminated by the introduction of a separate, isolated, oil filled compensation transducer capsule, as will now be described below with reference to FIGS. 2-6.

Figure 2:
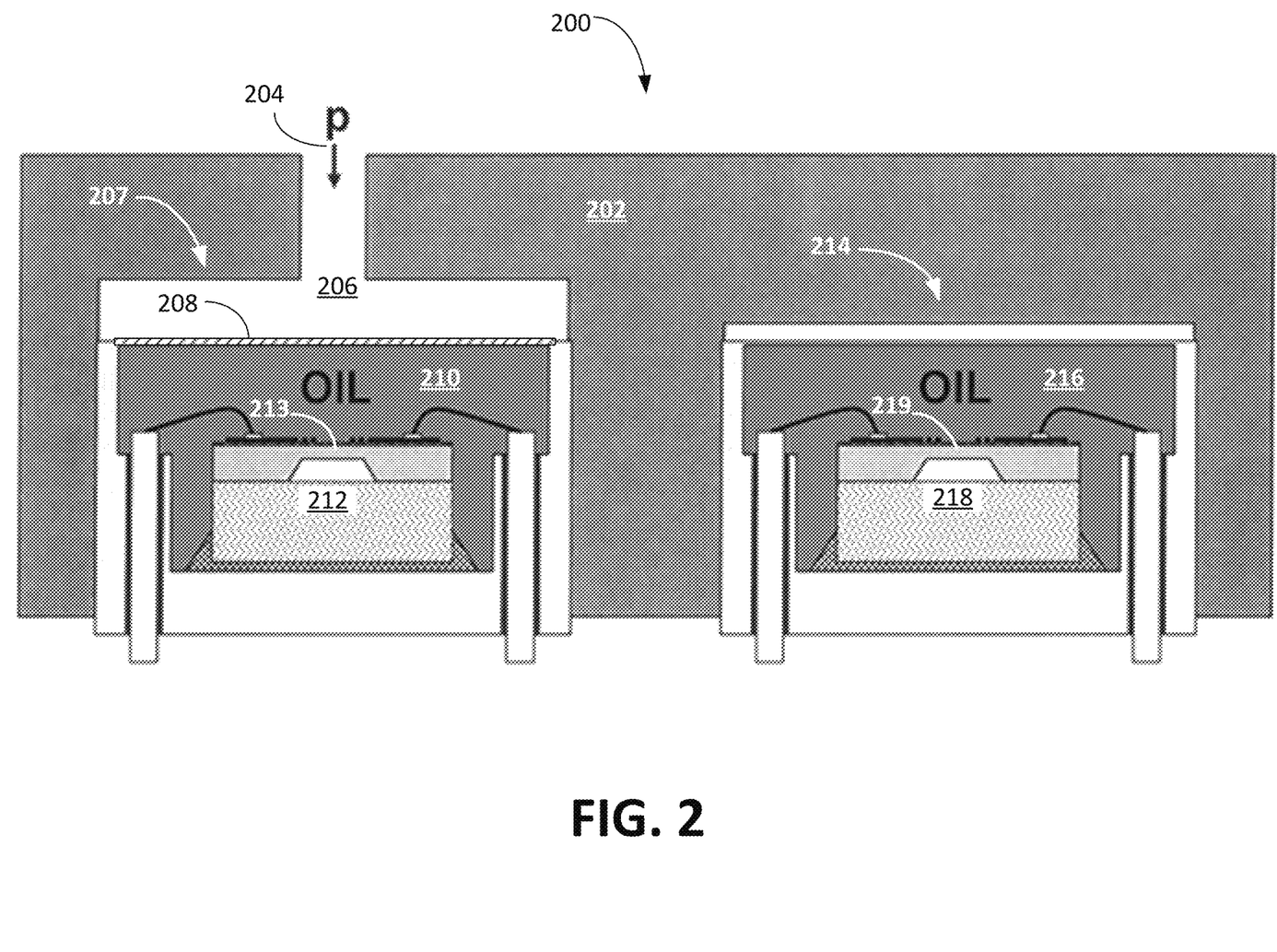
FIG. 2 depicts a cross-sectional side-view of an oil-filled transducer having an isolated compensating capsule, according to an example implementation of the disclosed technology.

FIG. 2 depicts a cross-sectional side-view of an oil-filled transducer assembly 200 in accordance with certain example implementations of the disclosed technology. The assembly 200 may include a pressure sensing capsule 207 having a pressure sensing element 212 sealed within in a first oil-filled cavity 210. The assembly also can include a compensating capsule 214 having a separate compensating sensing element 218 sealed with a second oil-filled cavity 216. In certain example implementations, the pressure sensing element 212 and the compensating sensing element 218 may be disposed near one another and attached to a common housing 202 so that they are subjected to the same acceleration and vibrational forces.

In certain example implementations, the pressure sensing element 212 and the compensating sensing element 218 may be practically identical, with the first membrane diaphragm 213 of the pressure sensing element 212 having essentially the same mass and configuration as the second membrane diaphragm 219 of the compensating sensing element 218. In certain example implementations, a same amount of oil may be utilized in both the first oil-filled cavity 210 and the second oil-filled cavity 216 so that equal acceleration and vibrational forces due to the oil may be measured by both elements 212, 218.

In accordance with certain example implementations of the disclosed technology, the pressure sensing element 212 may receive pressure 204 via an input port 206 exposed to pressure media. The pressure 204 may impinge on a protective diagram 208 that is configured to transfer the pressure through the first oil-filled cavity 210 and to the first membrane diaphragm 213 of the pressure sensing element 212. The compensating sensing element 218 may be in communication with the second-oil filled cavity 216 that is isolated from the pressure 204.

In certain example implementations, the compensating capsule 214 is configured to measure certain common error phenomena that act on both the pressure sensing element 212 and the compensating sensing element 218, while being isolated from the pressure 204 fluxuations in the pressure media. In certain example implementations, the signal measured by the compensating capsule 214 may be subtracted from the signal measured by the pressure sensing capsule 207 to provide an output signal that is compensated for common error errors, for example, due to acceleration and/or vibration. In other words, the compensating capsule 214 may be utilized to cancel-out the effects of acceleration and vibration sensitivity of the assembly 200 by exposing only the pressure sensing element 212 to the pressure 204 to be measured. In certain example implementations, both oil filled capsules 207, 214 may be manufactured to be extremely small, may be located as close as practically possible to each other, and may be mounted with the same orientation.

In accordance with certain example implementations of the disclosed technology, any conventional wafer processing techniques which enable dialectically isolated piezoresistive sensor elements to be formed on semiconductor material using dielectric films of SiO2 or the like may be used to form the elements 212, 218. In certain example implementations, Wheatstone bridges utilizing piezoresistive elements may be formed and utilized as the sensing components in the elements 212, 218. In some implementations, a Wheatstone bridge may include four oversized P+ diffused silicon electrical contact areas or fingers which may be located in non-active areas of the wafers associated with the piezoresistors of the respective elements 212, 218. It should be understood the active regions of the elements 212, 218 can be defined as those portions that are deflectable by the membrane diaphragms 213, 219, while the remaining portions may be referred to as the non-active regions.

In certain example implementations, the elements 212, 218 may be installed in the housing 202 by adhesive bonding. In some applications, a relatively hard epoxy-type adhesive can be utilized to secure the elements 212, 218 to the housing 102. In certain applications, such as in high-temperature environments, the elements 212, 218 may be secured using glass frit bonding. The use of such adhesives and/or bonding can enable assembly and packaging using standard high-volume semiconductor packaging techniques, which can include automated adhesive dispensing, glass frit dispensing, chip pick-and-place, and wire bonding/welding for making electrical interconnections between the elements 212, 218 and their respective headers.

Figure 3:
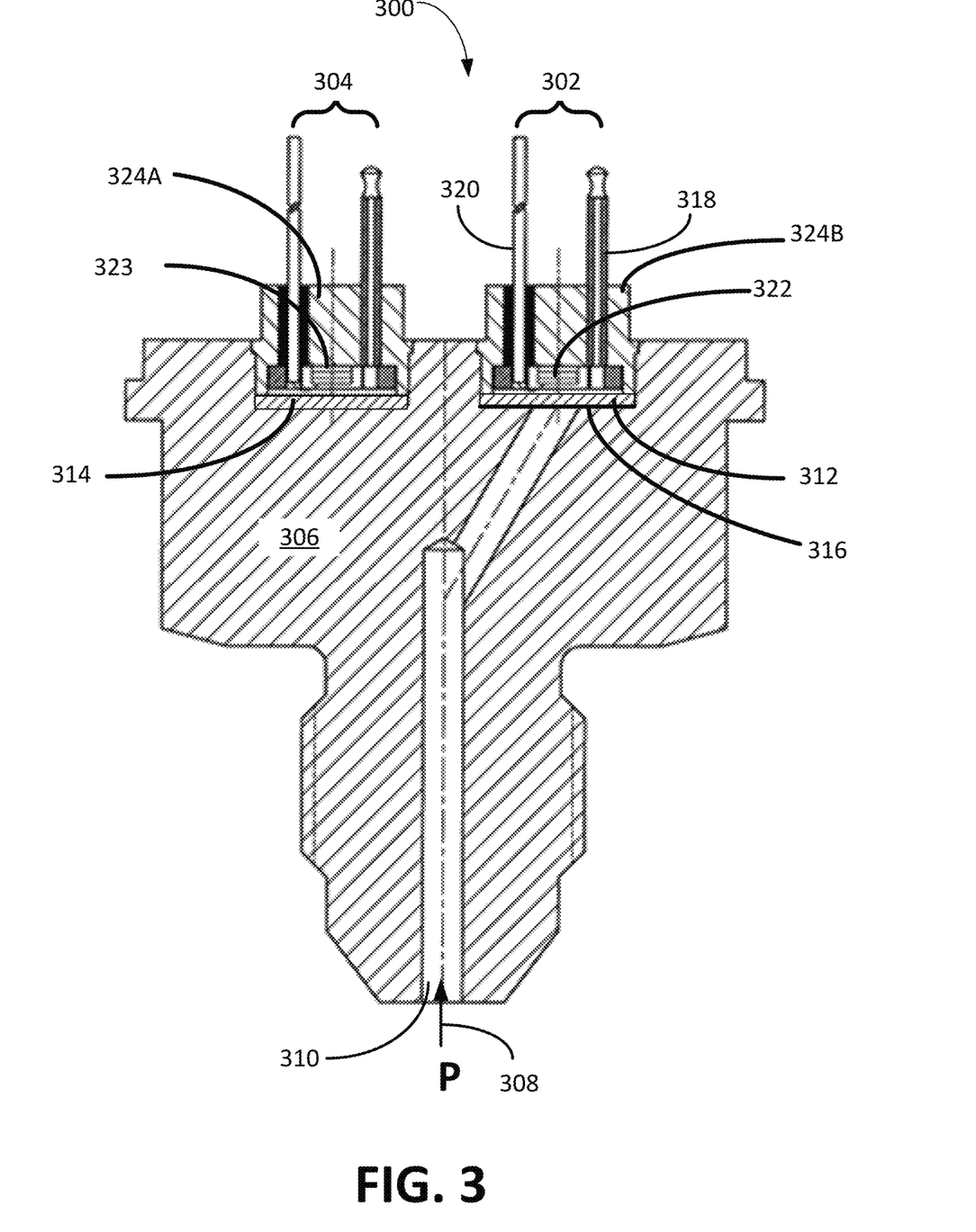
FIG. 3 is a cross-sectional side-view of an oil-filled transducer assembly having a side-by-side isolated compensating capsule, according to an example implementation of the disclosed technology.

FIG. 3 depicts a cross-sectional side-view of an oil-filled transducer assembly 300 having an oil-filled pressure sensing capsule 302 disposed side-by-side in a housing 306 with an isolated oil-filled compensating capsule 304, according to an example implementation of the disclosed technology, and as similarly discussed above with respect to FIG. 2. In accordance with certain example implementations of the disclosed technology, each capsule 302, 304 may include some or all of the same components, may be mounted in similar or identical headers 324A, 324B, and may be installed in the common housing 306. For example, each capsule 302, 304 may include a sealable oil tube 318 for filling the respective cavities 312, 314 with oil and for evacuating entrained air-bubbles from the oil before sealing the oil tube 318. In addition, each capsule 302, 304 may include a port 320 for supplying power to and/or receiving signals from the respective sensing elements 322, 323 via electrical wires or similar interconnections to an associated circuit, as will be discussed below with respect to FIGS. 5A-C.

In certain example implementations, the protective diaphragm 316 on the sensing capsule 302 may not be required on the compensating capsule 304, although some implementations may include the protective diaphragm 316 on the compensating capsule 304 as well, but without it being exposed to the pressure 308 from the pressure media.

In certain example implementations, both the oil-filled sensing capsule 302 and the oil-filled compensating capsule 304 include respective sensing elements 322, 323 sealed within first and second respective oil-filled cavities (such as cavities 210 and 216, as discussed above with respect to FIG. 2). In certain example implementations, the sensing elements 322, 323 may be practically identical, with essentially the same amount of oil utilized so that equal acceleration and vibrational forces due to the oil (and membranes and/or diaphragms) may be measured by both capsules 302, 304.

As depicted in FIG. 3, the sensing element 322 of the oil-filled sensing capsule 302 may receive pressure 308 via an input port 310 exposed to pressure media. The pressure 308 may be directed by the input port 310 to a protective diagram 316 of the sensing element 322 that is configured to transfer the pressure through the first oil-filled cavity 312 and to the first membrane diaphragm of the sensing element 322. As discussed above with respect to FIG. 2, the compensating sensing capsule 304 may have a sensing element 323 in communication with the second-oil filled cavity 314 that is isolated from the pressure 308.

In certain example implementations, the compensating capsule 304 may be configured to measure certain common error phenomena that act on both the compensating capsule 304 and the sensing capsule 302, while being insensitive to pressure 308 fluxuations in the pressure media by intentionally isolating the compensating capsule 304 from the pressure 308. In certain example implementations, the signal measured by the compensating capsule 304 may be subtracted from the signal measured by the sensing capsule 302 to provide an output signal that is compensated for common error errors, as will be discussed below with respect to FIGS. 5A-C.

In accordance with certain example implementations of the disclosed technology, the sensing capsule 302 may exhibit sensitivity to pressure 308 and all other contributors such as acceleration, vibration, oil volume, oil mass, temperature, etc., while the compensating capsule 304 may only exhibit sensitivity to acceleration, vibration, oil volume, oil mass, temperature, etc., and not to pressure. In certain example implementations where the two capsules 302, 304 are identical in their construction, their inherent sensitivity to acceleration, vibration, oil volume, oil mass, temperature, etc., may be practically identical. Thus, by subtracting the signal of the compensating capsule 304 from the signal of the sensing capsule 302, errors due to acceleration, vibration, oil volume, oil mass, temperature, etc., may be eliminated (or reduced).

Figure 4:
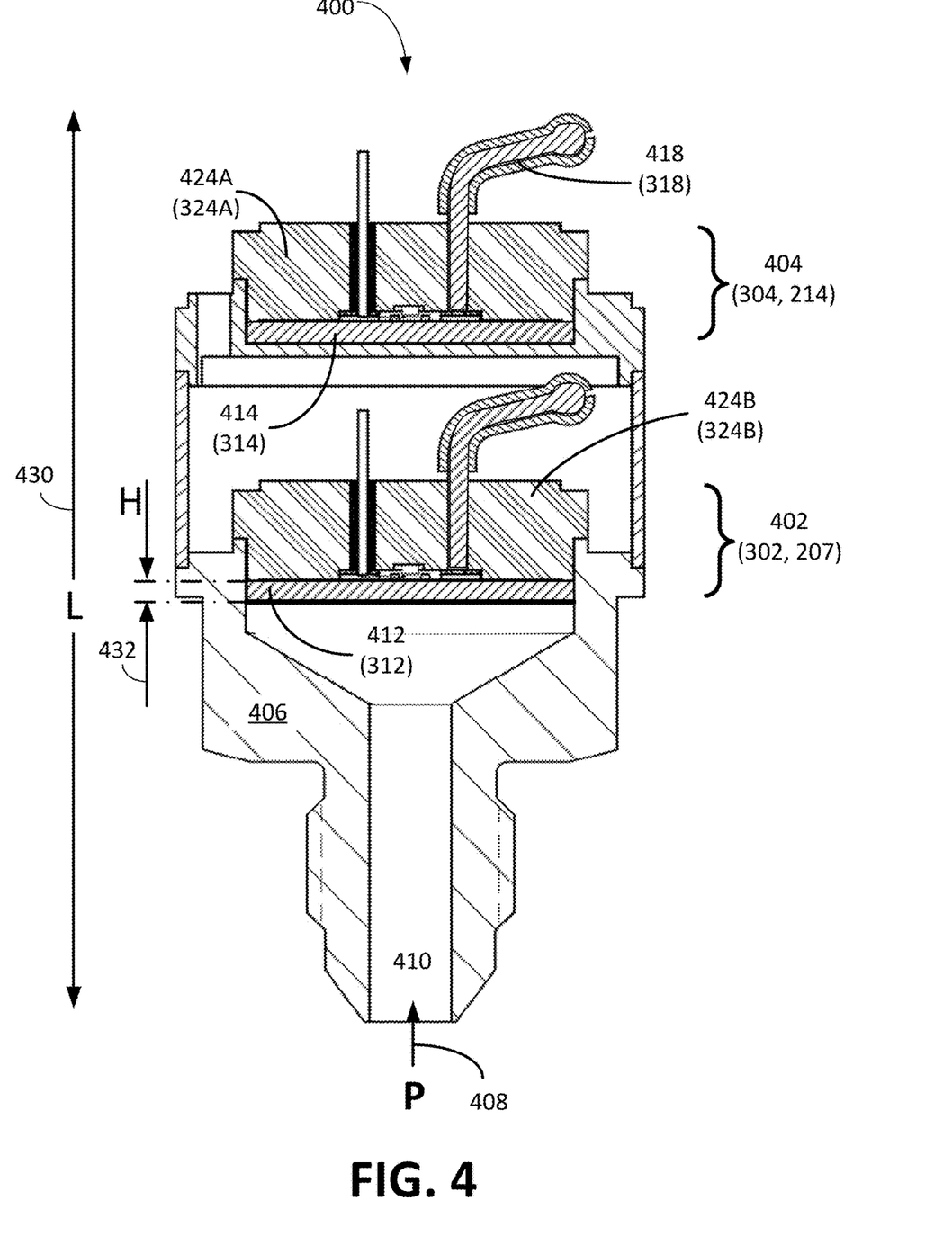
FIG. 4 is a cross-sectional side-view of an oil-filled transducer assembly having a stacked isolated compensating capsule, according to an example implementation of the disclosed technology.

FIG. 4 depicts a cross-sectional side-view of an oil-filled transducer assembly 400 having an oil-filled compensating capsule 404 vertically stacked together with an oil-filled sensing capsule 402, according to an example implementation of the disclosed technology. Additional components (not shown for clarity) may include interconnects, circuit boards, electronics, connectors, and/or additional housing 406 components utilized to interface with and/or secure the capsules 402, 404 and/or other components.

In accordance with certain example implementations, the dimensions and materials of the oil-filled compensating capsule 404 may be the same as or similar to the dimensions and materials of the oil-filled compensating capsule 304 as discussed with reference to FIG. 3 and/or the oil-filled compensating capsule 214 as discussed with reference to FIG. 2. In accordance with certain example implementations, the dimensions and materials of the oil-filled sensing capsule 402 may be the same or similar to the dimensions and materials of the oil-filled sensing capsule 302 as discussed with reference to FIG. 3 and/or the oil-filled sensing capsule 217 as discussed with reference to FIG. 2.

In certain example implementations, the length L 430 of the assembly 400 (not including the additional components mentioned above) can range from about 2 cm to about 3 cm. In certain implementations, the length L 430 of the assembly 400 can range from about 3 cm to about 4 cm. In certain implementations, the length L 430 of the assembly 400 can range from about 4 cm to about 5 cm. In certain implementations, the length L 430 of the assembly 400 can range from about 5 cm to about 6 cm.

In accordance with certain example implementations of the disclosed technology, and as may be applicable to each of the oil-filled capsules disclosed herein, since the oil may be a dominant factor in the acceleration- and vibration-related errors, it may be preferable to use as little oil as possible in each chamber 412, 414 and in the associated filling tubes 418. In certain example implementations, the height H 432 of the oil chambers 412, 414 may range from about 1 mm to about 2 mm. In certain implementations, the height H 432 of the oil chambers 412, 414 may range from about 2 mm to about 3 mm. In certain implementations, the height H 432 of the oil chambers 412, 414 may range from about 3 mm to about 4 mm.

In certain example implementations, the height of the oil chamber 412 of the sensing capsule 402 may differ from that of the oil chamber 414 of the compensating capsule 404. In certain example implementations, it may be preferable to have the volume of oil in the oil chamber 412 of the sensing capsule 402 to be the same as the volume of oil in the oil chamber 414 of the compensating capsule 404. In one example implementation, the volume of oil in the chambers 414, 412 may differ by less than 1%. In another example implementation, the volume of oil in the chambers 414, 412 may differ by between about 1% and about 2%. In another example implementation, the volume of oil in the chambers 414, 412 may differ by between about 2% and about 3%. In another example implementation, the volume of oil in the chambers 414, 412 may differ by between about 3% and about 4%. In another example implementation, the volume of oil in the chambers 414, 412 may differ by between about 4% and about 5%. In another example implementation, the volume of oil in the chambers 414, 412 may differ by between about 5% and about 6%. In another example implementation, the volume of oil in the chambers 414, 412 may differ by between about 6% and about 7%. In another example implementation, the volume of oil in the chambers 414, 412 may differ by between about 7% and about 8%. In another example implementation, the volume of oil in the chambers 414, 412 may differ by between about 8% and about 9%. In another example implementation, the volume of oil in the chambers 414, 412 may differ by between about 9% and about 10%. In another example implementation, the volume of oil in the chambers 414, 412 may differ by between about 10% and about 15%. In another example implementation, the volume of oil in the chambers 414, 412 may differ by between about 15% and about 20%. In another example implementation, the volume of oil in the chambers 414, 412 may differ by between about 20% and about 25%.

Since air entrained in the oil and/or trapped in the oil-chambers and/or filling tubes 418 can expand or contract with temperature (possibly creating additional temperature-related errors), it may be preferable (and in some cases—critical) to evacuate the air from the oil-filled cavities and associated oil-containing passages prior to (or during) sealing the oil-filling tubes 418. In certain example implementations, it may be preferable to fill the oil chamber, evacuate the air, and seal the oil-filling tubes before mounting the sensing elements and associated components to the headers 424A, 424B.

In accordance with certain example implementations of the disclosed technology, the vertical stacking arrangement of the capsules 402, 404 as shown in FIG. 4 may provide certain flexibilities and advantages associated with the manufacturing and use of the transducer assembly 400. For example, in one implementation, either or both the oil-filled sensing capsule 402 and the oil-filled compensating capsule 402 may be filled-with oil, evacuated, sealed, and/or tested prior to installation in the assembly 400. Furthermore, the capsules 402, 404 may be installed separately.

In certain implementations, the assembly 400 may be modularized, for example, so that an assembly 400 may be populated with the oil-filled sensing capsule 402 before the oil-filled compensating capsule 402 is installed. In yet other example implementations where vibration, acceleration, and/or temperature is not an issue, a completed assembly may include the oil-filled sensing capsule 402 without requiring installation of the oil-filled compensating capsule 402.

In accordance with certain example implementations of the disclosed technology, it may preferable to keep the headers 424A, 424B identical (as much as possible) to promote an equal response to acceleration, vibration, and temperature for both the oil-filled sensing capsule 402 and the oil-filled compensating capsule 402.

Figure 5A:
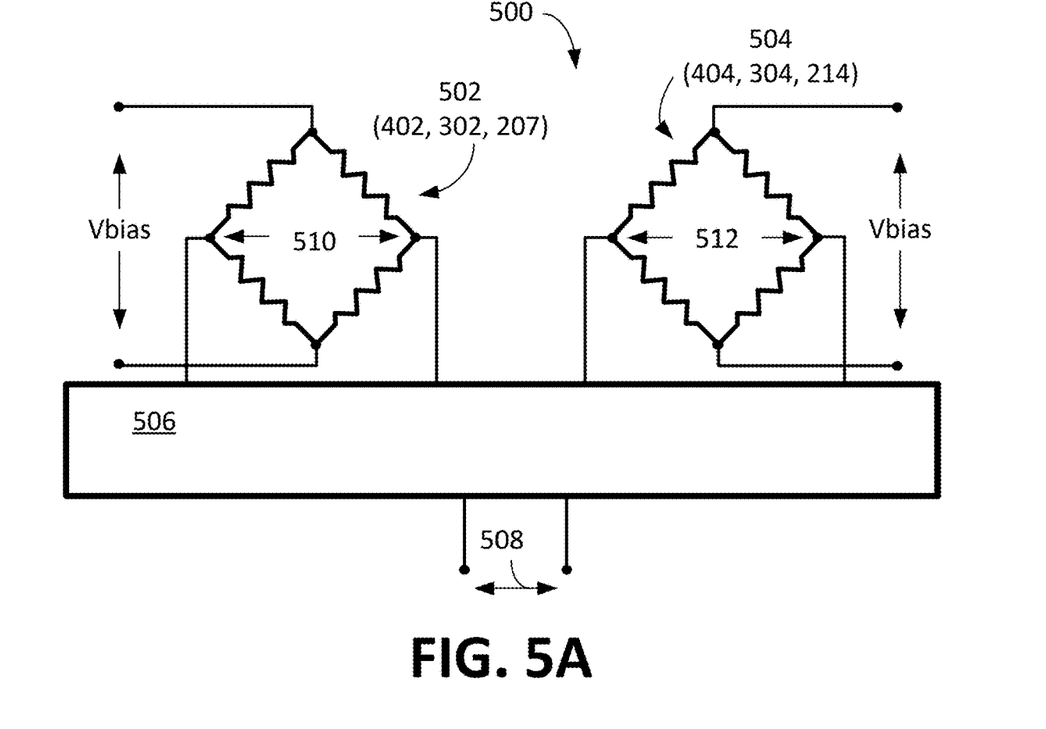
FIG. 5A is a block diagram of a compensation output circuit, according to an example implementation of the disclosed technology.

FIG. 5A depicts an example block diagram of a circuit 500 for compensating an output signal 510 of an oil-filled sensing capsule 502 with an output signal 512 from oil-filled compensating capsule 504. In certain example implementations, a circuit 506 (for example, as shown in FIG. 5B) may subtract the oil-filled compensating capsule 504 output signal 512 from the oil-filled sensing capsule 502 output signal 510 using active signal processing to produce a compensated output 508.

Figure 5B:
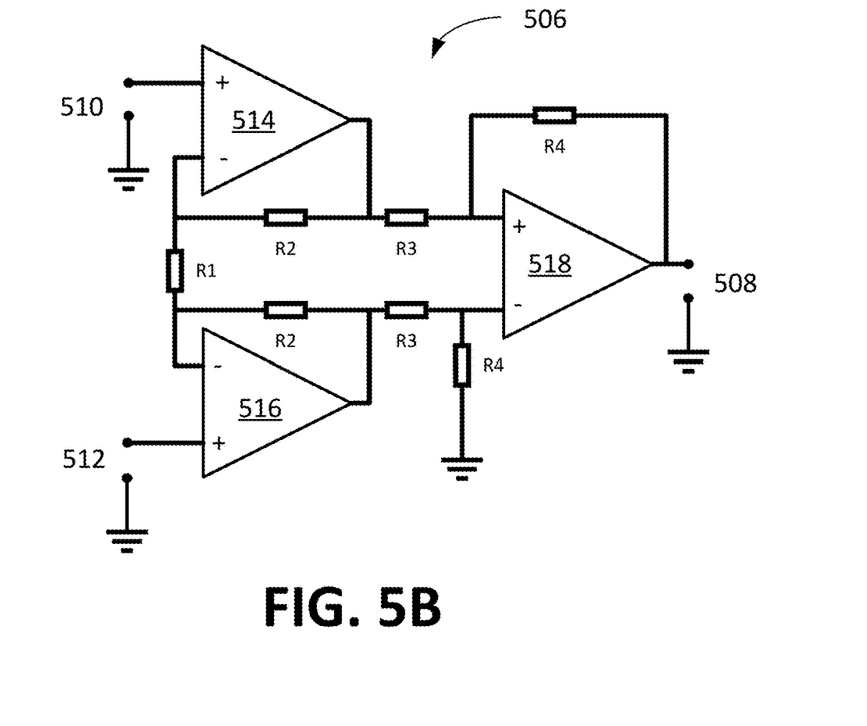
FIG. 5B is an example schematic diagram of an active compensation output circuit, according to an example implementation of the disclosed technology.

FIG. 5B is a schematic diagram of an active compensation output circuit 506, according to an example implementation of the disclosed technology. In this example embodiment, the respective output signals 510 and 512 from the respective capsules 502, 504 (as shown in FIG. 5A) may be input into respective voltage follower input buffers 514, 516. In accordance with certain example implementations of the disclosed technology, a differential amplifier 518 may receive the outputs from the input buffers 514, 516, and may be utilized to produce a compensated output 508 that is proportional to the output signal 510 from the oil-filled sensing capsule 502 minus the output signal 512 from the oil-filled compensating capsule 504.

Figure 5C:
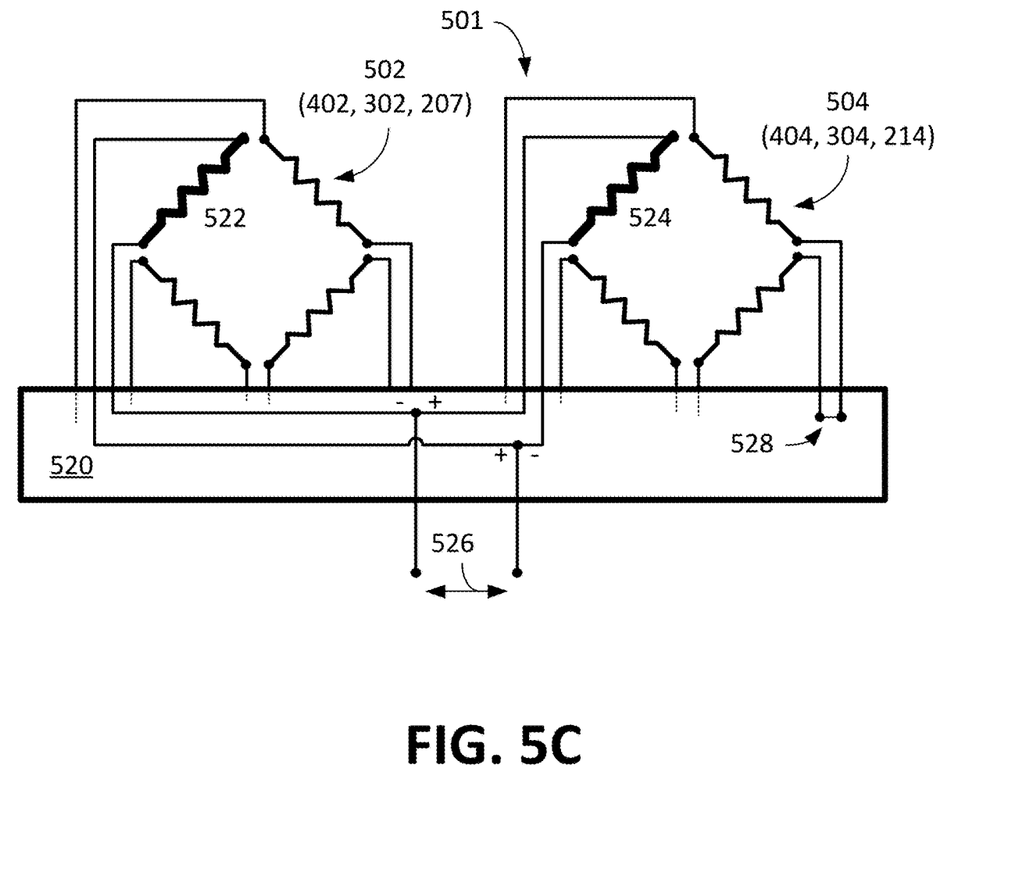
FIG. 5C is an example schematic diagram that illustrates the use of a passive circuit to produce a compensated output, according to an example implementation of the disclosed technology.

FIG. 5C depicts an example block diagram 501 of an alternative arrangement for compensating an oil-filled sensing capsule 502 with an oil-filled compensating capsule 504 utilizing a simple passive circuit 520 to produce a compensated output 526. In this example implementation, one or more of the various legs of the sensor elements 502, 504 may be separately connected to the passive circuit 520, which may be configured to allow for selected legs to be connected to produce the compensated output 508. For example, and for illustrative purposes only, a piezoresistor 522 of the oil-filled sensing capsule 502 is shown connected out-of-phase via the passive circuit 520 with the corresponding piezoresistor 524 of the oil-filled compensating capsule 504. In this (over-simplified) example, the piezoresistor 522 of the oil-filled sensing capsule 502 may respond to pressure, acceleration, vibration, and temperature while the piezoresistor 524 of the oil-filled compensating capsule 504 may be responsive to the same acceleration, vibration, and temperature—but not the pressure. By connecting the piezoresistors 522 524 in a similar arrangement, the compensated output 526 may include only the response to the pressure. Those having skill in the art will recognize that other components, such as capacitors, resistors, biasing voltage source(s), switches and/or additional interconnections 528, etc., may be utilized in the circuit 520.

Figure 6:
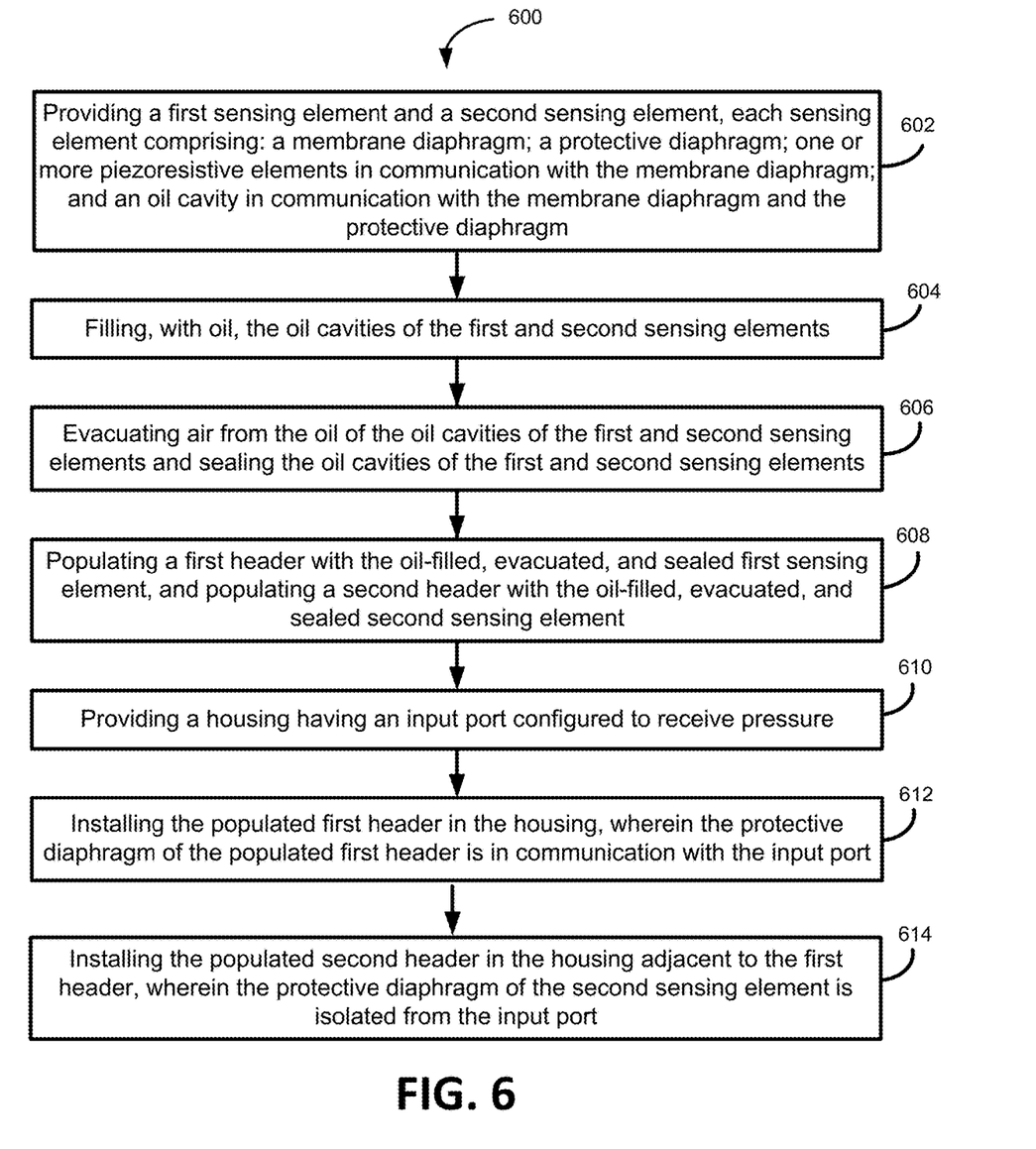
FIG. 6 is a flow diagram of a method, according to an example implementation of the disclosed technology.

FIG. 6 is a flow diagram of a method 600 of assembling a pressure transducer assembly, according to an example implementation of the disclosed technology. In block 602 the method 600 can include providing a first sensing element and a second sensing element, each sensing element comprising: a membrane diaphragm; a protective diaphragm; one or more piezoresistive elements in communication with the membrane diaphragm; and an oil cavity in communication with the membrane diaphragm and the protective diaphragm. In block 604 the method 600 can include filling, with oil, the oil cavities of the first and second sensing elements. In block 606 the method 600 can include evacuating air from the oil of the oil cavities of the first and second sensing elements and sealing the oil cavity of the first and second sensing elements. In block 608 the method 600 includes populating a first header with the oil-filled, evacuated, and sealed first sensing element, and populating a second header with the oil-filled, evacuated, and sealed second sensing element. In block 610 the method 600 includes providing a housing having an input port configured to receive pressure. In block 612 the method 600 includes installing the populated first header in the housing, wherein the protective diaphragm of the populated first header is in communication with the input port. In block 614 the method 600 includes installing the populated second header in the housing adjacent to the first header, wherein the protective diaphragm of the second sensing element is isolated from the input port.

In certain example implementations, each sensing element may further include a sealable oil-filling tube configured for filling the oil cavity and sealing the oil cavity.

Certain example implementations of the disclosed technology can include testing one or more of the populated first header and the populated second header before installing the populated headers in the housing.

Certain example implementations of the disclosed technology can include mounting to the housing, a circuit comprising one or more active electronic components configured to output a compensated pressure output signal based on a subtraction of a common error compensation signal measured by the second sensing element from a pressure and common error signal measured by the first sensing element.

In one example implementation of the disclosed technology, the populated first header and the populated second header are installed in the housing in a side-by-side arrangement.

In another example implementation, the populated first header and the populated second header are installed in the housing in a vertically stacked arrangement.

In certain example implementations, the populated first header is identical to the populated second header In certain example implementations, the oil cavities of each sensing element are filled to include equal volumes of oil.

In accordance with certain example implementations of the disclosed technology, the populated second header is installed in the housing in the same orientation as the populated first header.

In accordance with certain example implementations of the disclosed technology, the oil-filled sensing capsules 502, 402, 302, 207 and/or the oil-filled compensating capsules 504, 404, 304, 214 may be or include hermetically sealed sensors. It should be understood that other structures can be used.

In certain example implementations, an oil-filled pressure transducer assembly is provided. The assembly may include a housing having an input port configured to receive pressure. The assembly can include an oil-filled pressure sensing capsule attached to the housing and in communication with the input port. In certain implementations, the oil-filled pressure sensing capsule may be configured to output a pressure signal and a common error signal respectively responsive to pressure received at the input port and a common error stimulus acting on the transducer assembly. The common error stimulus can include one or more of vibration, acceleration, and temperature. The assembly can also include an oil-filled compensating capsule attached to the housing adjacent to the oil-filled pressure sensing capsule and isolated from the input port. In certain implementations, the oil-filled compensating capsule may be configured to output a compensation signal responsive to the common error stimulus. In certain example implementations, the compensation circuit may be in communication with the oil-filled pressure sensing capsule and the oil-filled compensating capsule. In certain example implementations, the compensation circuit may be configured to output a compensated pressure output signal that is based on a difference between the combined pressure signal and the common error signal of the oil-filled pressure sensing capsule, and the compensation signal of the oil-filled compensating capsule.

In accordance with certain example implementations of the disclosed technology, the oil-filled pressure sensing capsule and the oil-filled compensating capsule may be attached to the housing in a side-by-side arrangement.

In certain example implementations, the oil-filled pressure sensing capsule and the oil-filled compensating capsule may be attached to the housing in a vertically stacked arrangement.

In some implementations, the oil-filled pressure sensing capsule and the oil-filled compensating capsule can include equal volumes of oil. In some implementations, the oil-filled pressure sensing capsule and the oil-filled compensating capsule may be attached to the housing in a same (or common) orientation.

In accordance with certain example implementations of the disclosed technology, the oil-filled pressure sensing capsule and the oil-filled compensating capsule can each include one or more equivalent deflectable membrane diaphragms, Wheatstone bridges comprising piezoresistors, evacuated and sealed oil-filled cavities, and/or protective diaphragms in communication with the oil-filled cavities.

In accordance with certain example implementations of the disclosed technology, the compensation circuit may include at least one voltage source configured to bias one or more of a first transducer of the oil-filled pressure sensing capsule and a second transducer of the oil-filled compensating capsule to reduce the difference between the common error signal and the compensation signal.

In certain example implementations, the compensation circuit may include one or more passive interconnects configured to output the difference between the combined pressure and common error signal of the oil-filled pressure sensing capsule, and the compensation signal of the oil-filled compensating capsule.

In accordance with certain example implementations of the disclosed technology, the compensation circuit may include one or more active electronic components configured to output the compensated pressure output signal based on a subtraction of the compensation signal measured by the compensating capsule from the pressure and common error signal measured by the oil-filled pressure sensing capsule.

In accordance with certain example implementations of the disclosed technology, the compensation circuit can include one or more voltage-follower input buffers. In accordance with certain example implementations of the disclosed technology, the compensation circuit can include and a differential amplifier in communication with the one or more voltage-follower input buffers.

According to an example implementation of the disclosed technology, the housing, the oil-filled pressure sensing capsule, and the oil-filled compensating capsule may be collectively characterized by a length L ranging from 2 centimeters to 4 centimeters.

According to an example implementation of the disclosed technology, the oil-filled pressure sensing capsule and the oil-filled compensating capsule may each include a sealed oil-chamber characterized by a height H ranging from 1 millimeter to 3 millimeters.

According to an example implementation of the disclosed technology, the oil-filled pressure sensing capsule and the oil-filled compensating capsule may each include an equivalent membrane diaphragm having the same mass and configuration.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The term "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term: "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way but may also be configured in ways that are not listed.

Ranges have been expressed herein as from "about" or "approximately" one particular value and/or to "about" or "approximately" another particular value. When such a range is expressed, an embodiment includes values from the one particular value (starting point) and/or to the other particular value (ending point). In certain embodiments, the term "about" signifies a buffer of +/−10% of the said range about each said starting point and/or ending point. In certain embodiments, the term "about" signifies a buffer of +/−5% of the said range about each said starting point and/or ending point.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, certain modifications and changes may be made without departing from the scope of the disclosed technology, as set forth in the claims below. For example, although the example methods, devices and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

What is claimed is:

1. An oil-filled pressure transducer assembly, comprising:
   a housing having an input port configured to receive pressure;
   an oil-filled pressure sensing capsule attached to the housing and in communication with the input port, wherein the oil-filled pressure sensing capsule is configured to output a pressure and common error signal responsive to pressure received at the input port and common error stimulus acting on the transducer assembly, the common error stimulus comprising one or more of vibration, acceleration, and temperature;
   an oil-filled compensating capsule attached to the housing adjacent to the oil-filled pressure sensing capsule and isolated from the input port, wherein the oil-filled compensating capsule is configured to output a compensation signal responsive to the common error stimulus; and
   a compensation output circuit in communication with the oil-filled pressure sensing capsule and the oil-filled compensating capsule, the compensation output circuit configured to output a compensated pressure output signal based on a difference between the pressure and common error signal of the oil-filled pressure sensing capsule and the compensation signal of the oil-filled compensating capsule.

2. The oil-filled pressure transducer assembly of claim 1, wherein the oil-filled pressure sensing capsule and the oil-filled compensating capsule are attached to the housing in a side-by-side arrangement.

3. The oil-filled pressure transducer assembly of claim 1, wherein the oil-filled pressure sensing capsule and the oil-filled compensating capsule are attached to the housing in a vertically stacked arrangement.

4. The oil-filled pressure transducer assembly of claim 1, wherein the oil-filled pressure sensing capsule and the oil-filled compensating capsule include equal volumes of oil and are attached to the housing in a same orientation.

5. The oil-filled pressure transducer assembly of claim 1, wherein both the oil-filled pressure sensing capsule and the oil-filled compensating capsule include one or more equivalent:
   deflectable membrane diaphragms;
   Wheatstone bridges comprising piezoresistors;
   evacuated and sealed oil-filled cavities; and
   protective diaphragms in communication with the oil-filled cavities.

6. The oil-filled pressure transducer assembly of claim 1, wherein the compensation output circuit includes:
   at least one voltage source configured to bias one or more of a first transducer of the oil-filled pressure sensing capsule and a second transducer of the oil-filled compensating capsule to reduce the difference between the common error signal and the compensation signal; and
   one or more passive interconnects configured to output the difference between the pressure and common error signal of the oil-filled pressure sensing capsule and the compensation signal of the oil-filled compensating capsule.

7. The oil-filled pressure transducer assembly of claim 1, wherein the compensation output circuit includes:
   one or more active electronic components configured to output the compensated pressure output signal based on a subtraction of the compensation signal measured by the compensating capsule from the pressure and common error signal measured by the oil-filled pressure sensing capsule.

8. The oil-filled pressure transducer assembly of claim 7, wherein the compensation output circuit comprises two voltage-follower input buffers and a differential amplifier in communication with the two voltage-follower input buffers.

9. The oil-filled pressure transducer assembly of claim 1, wherein the housing, the oil-filled pressure sensing capsule, and the oil-filled compensating capsule are collectively characterized by a length L ranging from 2 centimeters to 4 centimeters.

10. The oil-filled pressure transducer assembly of claim 1, wherein the oil-filled pressure sensing capsule and the oil-filled compensating capsule each comprise a sealed oil-chamber characterized by a height H ranging from 1 millimeter to 3 millimeters.

11. The oil-filled pressure transducer assembly of claim 1, wherein the oil-filled pressure sensing capsule and the oil-filled compensating capsule each comprise an equivalent membrane diaphragm having the same mass and configuration.

12. A method of assembling a pressure transducer assembly, the method comprising:
   providing a first sensing element and a second sensing element, each sensing element comprising:
      a membrane diaphragm;
      a protective diaphragm;
      one or more piezoresistive elements in communication with the membrane diaphragm; and
      an oil cavity in communication with the membrane diaphragm and the protective diaphragm;
   filling the oil cavity of the first sensing element with oil;
   evacuating air from the oil of the oil cavity of the first sensing element and sealing the oil cavity of the first sensing element;
   populating a first header with the oil-filled, evacuated, and sealed first sensing element;
   providing a housing having an input port configured to receive pressure;
   installing the populated first header in the housing, wherein the protective diaphragm is in communication with the input port;
   filling the oil cavity of the second sensing element with oil;
   evacuating air from the oil of the oil cavity of the second sensing element and sealing the oil cavity of the second sensing element;
   populating a second header with the oil-filled, evacuated, and sealed second sensing element; and
   installing the populated second header in the housing adjacent to the first header, wherein the protective diaphragm of the second sensing element is isolated from the input port.

13. The method of claim 12, wherein each sensing element further comprises a sealable oil-filling tube configured for filling the oil cavity and sealing the oil cavity.

14. The method of claim 12, further comprising testing one or more of the populated first header and the populated second header before installing the populated headers in the housing.

15. The method of claim 12, further comprising mounting to the housing, a circuit comprising one or more active electronic components configured to output a compensated pressure output signal based on a subtraction of a common error compensation signal measured by the second sensing element from a pressure and common error signal measured by the first sensing element.

16. The method of claim 12, wherein the populated first header and the populated second header are installed in the housing in a side-by-side arrangement.

17. The method of claim 12, wherein the populated first header and the populated second header are installed in the housing in a vertically stacked arrangement.

18. The method of claim 12, wherein the populated first header is identical to the populated second header.

19. The method of claim 12, wherein the oil cavities of each sensing element are filled to include equal volumes of oil.

20. The method of claim 12, wherein the populated second header is installed in the housing in the same orientation as the populated first header.

* * * * *